(12) United States Patent
Michaud

(10) Patent No.: US 7,162,952 B1
(45) Date of Patent: Jan. 16, 2007

(54) DEVICE FOR SQUEEZING FLUID FROM A CONTAINER OF FOOD PACKED IN FLUID

(76) Inventor: Leo Michaud, 7526 S. Swift Rd., Goodlettsville, TN (US) 37072

( * ) Notice: Subject to any disclaimer, the term of this patent is extended or adjusted under 35 U.S.C. 154(b) by 0 days.

(21) Appl. No.: 11/287,989

(22) Filed: Nov. 28, 2005

(51) Int. Cl.
*B30B 9/06* (2006.01)
*B30B 7/00* (2006.01)

(52) U.S. Cl. .................. 100/110; 100/234; 294/65.5; 99/495; D7/666

(58) Field of Classification Search ............. 100/104, 100/110, 116, 126, 234, 243, 293; 99/495, 99/506, 507; 294/65.5; 210/464, 470; D7/666, D7/667
See application file for complete search history.

(56) References Cited

U.S. PATENT DOCUMENTS

| | | | |
|---|---|---|---|
| 4,355,574 A | 10/1982 | Bond et al. | |
| D311,116 S | 10/1990 | Pentland | |
| D330,313 S | 10/1992 | Green | |
| 5,272,969 A * | 12/1993 | McDonald | 100/110 |
| 5,372,063 A | 12/1994 | Berg | |
| 5,403,053 A * | 4/1995 | Zareck | 294/16 |
| 5,706,721 A | 1/1998 | Homes | |
| 6,227,104 B1 | 5/2001 | Watkins, Jr. | |
| 6,561,084 B1 * | 5/2003 | Lane | 99/508 |
| 6,745,682 B1 * | 6/2004 | Tranberg | 100/110 |
| 2002/0092430 A1 * | 7/2002 | Dempsey | 100/234 |

* cited by examiner

*Primary Examiner*—Lowell A. Larson
*Assistant Examiner*—Jimmy T Nguyen

(57) ABSTRACT

A device includes two handle elements with a can support on one handle and a can contents engaging unit on the other handle element. A trigger mechanism is included to ensure complete draining of the fluid from the can and various adapter elements are also included so the device can be used with cans of various sizes. A wall mounting element is also included.

2 Claims, 2 Drawing Sheets

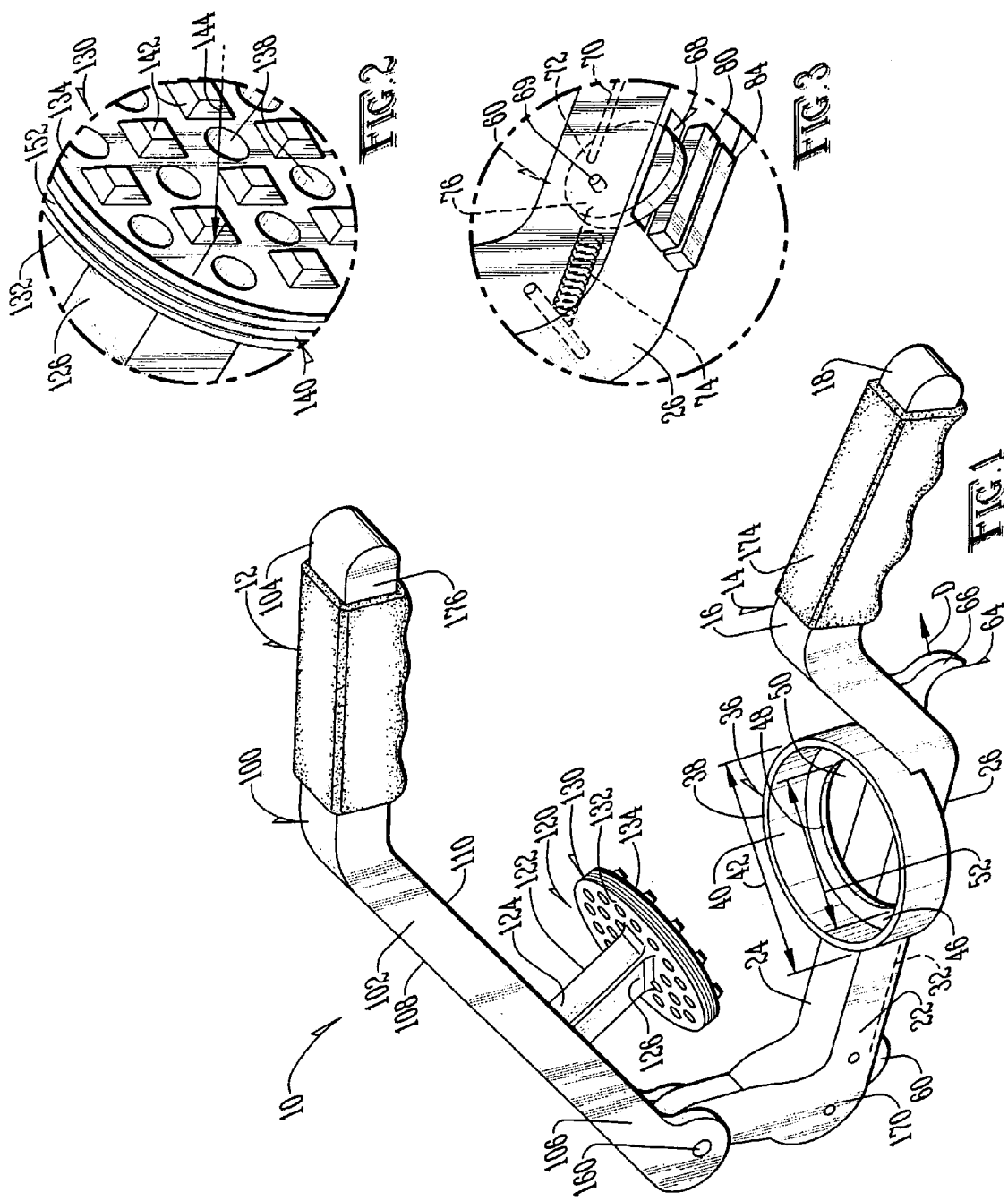

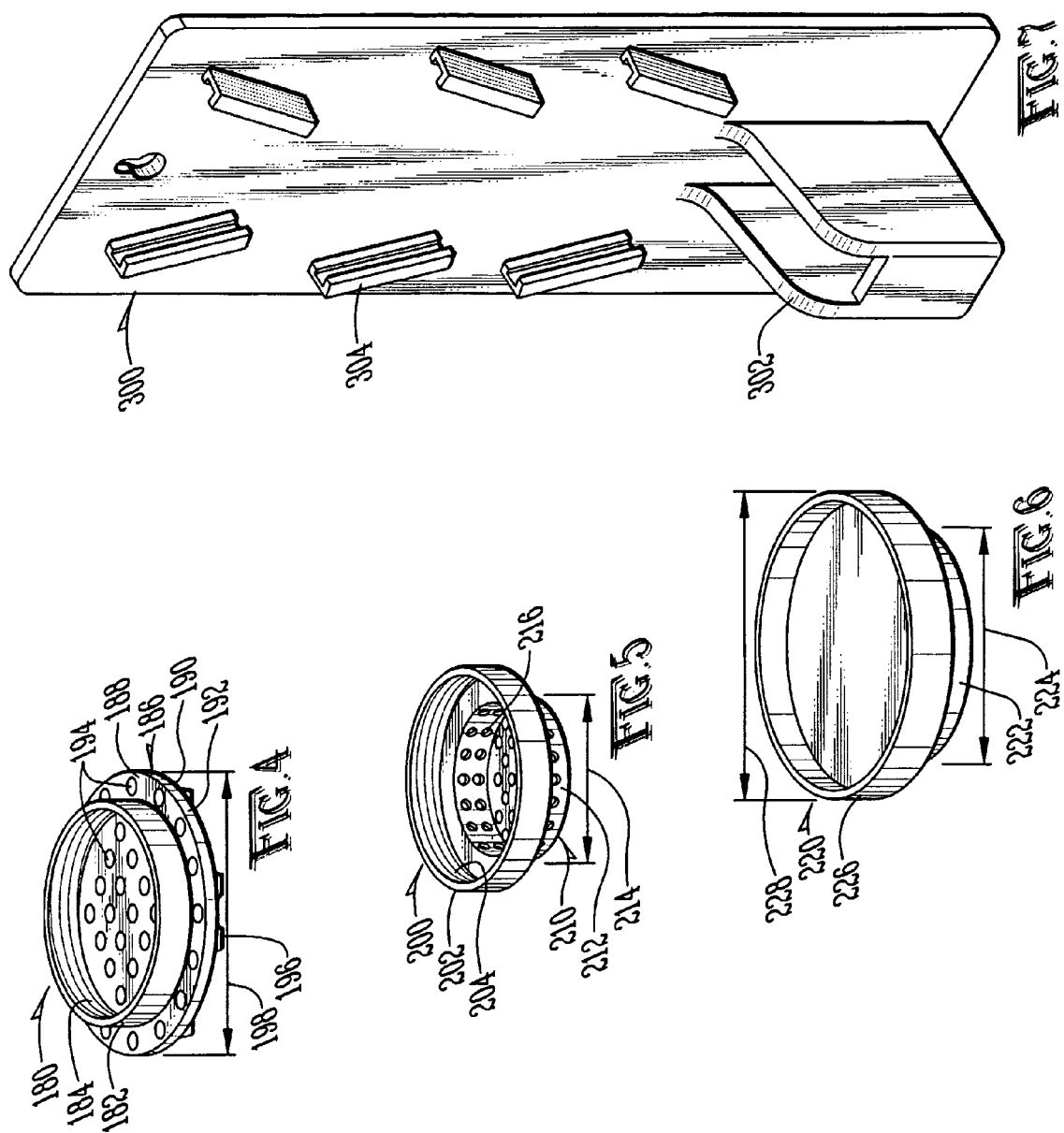

DEVICE FOR SQUEEZING FLUID FROM A CONTAINER OF FOOD PACKED IN FLUID

TECHNICAL FIELD OF THE INVENTION

The present invention relates to the general art of foods and beverages, and to the particular field of isolating one constituent from another in a container of multiple constituents.

BACKGROUND OF THE INVENTION

Canning foods has been an important part of food preservation and manufacturing since the invention by the British of tin cans for preserving meat for long sea voyages in 1812. Even after the advent and widespread use of other methods of food preservation such as freezing, the production of shelf-stable canned foods such as fish remains an important part of the food industry. Canned tuna and salmon, for example, represent 90% of the total fish packed in the United States.

In a typical process, fish, most of which have been frozen on the fishing vessel and held frozen in air until the cannery is approached, are thawed. They are eviscerated, precooked, cleaned, and the meat, sorted. Dark meat and trimmings are used for making pet food, meal and oil. The better fish fillets are cut and packed by machine as solid meat or chunks for human consumption. Filled cans pass down a line where salt and then oil or water are added, and the cans are heated, sealed, and retorted.

Similarly, canned meats are typically manufactured by heat processing to produce either pasteurized or shelf-stable products. The former must be held under refrigeration, as in the case of canned hams and picnics (pork shoulders). Shelf-stable canned meats are heated for a sufficient time to destroy most pathogens and can be cured without refrigeration. Common canned meat items include hams, luncheon meats, meat balls, Vienna sausage, and potted meat. Some of these are reacted with curing ingredients before being sealed in cans and heat-processed.

Because of differences in the food product, vegetable canning is slightly different. In vegetable canning, the vegetables are typically washed with chlorinated water to remove soil, stones, and other debris and to reduce the microbial population. Products are sorted, trimmed, peeled, and/or sliced according to specific need. Many products are then blanched, i.e., subjected to relatively mild heat treatment before packing into a container. Blanching serves as a final wash to reduce the microbial load, removing certain raw or off-flavors, and increases the pliability of the product to facilitate filling and permitting expulsion of dissolved or occluded gases from plant tissue. During blanching, the product is exposed to hot water or steam for several minutes and then immediately put into containers and packed in salt brine or syrups to cover. Filled containers are generally exhausted by being passed through a hot water bath or steam chamber to expel gas and expand the product before the can is sealed.

Unlike vegetables, which ordinarily require pressure-cooker processing up to about 250E C. to inactivate spores of Clostridium botulinum that may grow in foods stored at room temperature and neutral pH's, many fruits naturally possess sufficient acidity to permit thermal preservation at lower, i.e., boiling water temperature, before canning. Fruits are prepared by washing, sorting, and trimming. Specialized preparation may be required for some fruits, such as stem and pit removal for cherries and peel and core removal for apples. Sliced or prepared fruit may require blanching to remove tissue gases prior to filling. Aggregate fruit products such as whole berries or sliced portions may be canned in water or sugar syrups. Filled containers are exhausted by thermal or vacuum within the container upon cooler. Sealed containers are typically heated in water or atmospheric steam to about 200E F. in the container center prior to cooling.

The inventor has observed that almost all canned food products are stored in some kind of packing fluid that is an oil, brine, syrup, fruit or vegetable juice, or the like, or mixtures of these. Removing this fluid has been the source of mess and frustration since the advent of the tin can.

When canned food products are opened, it is common practice to partially or fully drain off the packing fluid before eating the foodstuff or using it in a recipe. Indeed, many recipes such as those calling for tuna or spinach require that the foodstuff be completely wrung out to remove as much of the packing fluid as possible.

For example, tuna is usually advertised as being water or oil packed. This would seem to indicate that the liquid is only around the tuna. If this were the case, the user could simply hold the severed lid against the contents and pour the liquid off. The fact is most of the liquid is retained within the tuna itself. Most people squeeze out the liquid by first opening the can and then pushing the severed lid down in the can with their fingers or thumbs while holding the can upside down. This procedure exerts forces on the lid primarily at the two finger engaging points. This causes the thin lid to bend which obviously applies an uneven pressure against the tuna. A good share of the juice thus still remains within the tuna. This is particularly so with persons with weak hands. The two point uneven pressure can also cause the edges of the lid to bend up and be a source of injury to the user. Also, pressing of the liquid from the can in the above manner not only exposes the fingers to the odorous contents but unless precise even pressure is applied the lid frequently sticks in the can. Furthermore getting the lid out of the can after pressing is time consuming and can result in injury.

A number of devices have been suggested for draining off, and in some cases squeezing out, packing fluid from a canned food product. Whether the can is opened with a can opener or a key, or the can is a glass jar with a lid, a common means of accomplishing this is to use the lid as a press. After opening the can around its edge, the can is tipped and fluid, decanted. If more fluid is to be removed, the lid is pushed down on the can contents while the can remains tipped. Because of the geometry of the can lid, however, this procedure is messy because the only way packing fluid can escape is around the lid. Packing fluid typically squirts out all round the lid, and on the hand and often down the arm of the person holding the tipped can.

Furthermore, some people, especially the elderly, may have trouble controlling these can squeezing devices. These people may not be able to generate sufficient pressure to totally remove all of the fluid from the can, and may subject their hands to danger by placing them near the ragged edges of the can to remove liquid that the press leaves.

Therefore, there is a need for a device that can efficiently remove liquid from a can containing food packed in liquid and which a person with limited hand strength can easily use to fully remove fluid from the can.

Still further, many cans come in various sizes. For example, some tuna is sold in single-serving size cans while other tuna is sold in larger sizes. To be effective, a press should fit the can; however, a press sized to fit a large can will not fit a small can, and a press sized to fit a small can may not be efficient when used with a large can.

Therefore, there is a need for a device that can remove liquid from a can containing food packaged in liquid which is adaptable to various sizes of cans.

SUMMARY OF THE INVENTION

The above-discussed disadvantages of the prior art are overcome by a device that is used to press liquid from a can and which includes handles for increasing the mechanical advantage of the pressing and can accommodating means which can be sized to accommodate the size of the particular can being drained. The device further has a trigger mechanism to ensure complete squeezing of the product.

Using the device embodying the present invention will permit a user to fully squeeze liquid from a can even if the user has weak hands. The device can be adapted for a variety of different size cans so it is versatile.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWING FIGURES

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 1 is a perspective view of a device for squeezing liquid from a can containing food packed in liquid embodying the present invention.

FIG. 2 is a detail view showing a food contacting element included in the device shown in FIG. 1.

FIG. 3 is a detail view showing a portion of a trigger mechanism included with the device shown in FIG. 1.

FIG. 4 is a perspective view of an accessory that can be used to accommodate a can of a size different from that associated with the device shown in FIG. 1.

FIG. 5 is a perspective view of an accessory that can be used to accommodate a can of a size different from that associated with the device shown in FIG. 1.

FIG. 6 is a perspective view of an accessory that can be used to accommodate a can of a size different from that associated with the device shown in FIG. 1.

FIG. 7 is a perspective view of a wall mounting element that can be used in connection with the device shown in FIG. 1 and the elements shown in FIGS. 4–6.

DETAILED DESCRIPTION OF THE INVENTION

Referring to the figures, it can be understood that the present invention is embodied in a device 10 for squeezing fluid from a can containing food, such as tuna or the like, packed in fluid, such as water or oil, or the like.

Device 10 comprises a handle unit 12 which is grasped and operated by a user to squeeze the fluid from a can. Handle unit 12 includes a first handle element 14 having body section 16 with a first end 18, a second end 22, a first surface 24 which is an upper surface when the handle unit is in use, such as shown in FIG. 1, and a second surface 26 which is a lower surface when the handle unit is in use. A portion 32 of body section 16 is hollow for a purpose which will be understood from the following disclosure.

A can supporting element 36 is located on first surface 24, can supporting element 36 includes a tubular outer wall 38 having an inner surface 40 with an inner dimension 42. An inner rim 46 is located on inner surface 40 of outer wall 38. Inner rim 46 has an inner edge 48 which defines an inner annular opening 50 having a dimension 52 which is less than inner dimension 42 of outer wall 38.

A pivot unit 60 is located on second end 22 of first handle element 14. A trigger unit 64 is located on first handle element 14. Trigger unit 64 includes a trigger element 66 movably mounted on second surface 26 of body section 16 and a lever element 68 pivotally mounted on second end 22 of body section 16. A link element 70 connects one portion 72 of the lever element 68 to the trigger element so movement of the trigger element causes corresponding movement of the lever element 68. A second link element 74 is connected to another portion 76 of the lever element 68 for movement therewith so that movement of the trigger element is transferred to the second link element. The second link element 74 may be a spring to maintain the level element 68 at its normal position. Once the trigger unit 64 is activated, the link element 70 may pull on the level element 68 to pivot about a pivot axis 69 to cause the level element 68 to further extend from the second surface 26.

The second surface 26 may also have a leverage element 84 and a magnet 80. The magnet 80 may be between the level element 68 and the leverage element 84. The leverage element 84, magnet 80, and the level element 68 may extend from the second surface 26 about the same distance when the level element 68 is in a normal position. Once the lid of a can is opened with a can opener, the lid can be removed by placing the magnet 80 on the lip which will then attract to the magnet 80. The lid can be then lifted from the can and disposed of by triggering the trigger unit 64 which causes the level element 72 to further extend from the second surface 26. As the level element 72 extends, the lid pivots about the leverage element 84 to pull away the lid from the magnet 80. The distance between the lid and the magnet 80 weakens the magnetic force so that weight of the lid causes the lip to drop into a trash can. This way, a user can remove the lid of a can without having to touch the lid which can have sharp edges.

A second handle element 100 includes body section 102 having a first end 104, a second end 106, a first surface 108 which is an upper surface when the handle unit is in use, and a second surface 110 which is a lower surface when the handle unit is in use.

A can contents contacting element 120 is mounted on second surface 110 of body section 102 and includes a support post 122 having a base end 124 and a distal end 126, with base end 124 being mounted on second surface 110 to extend away from second surface 110. A plate 130 is located on distal end 126 of support post 122. Plate 130 has a first surface 132, a second surface 134 and an outer rim 140 which connects the first and second surfaces of plate 130. A plurality of fluid drain holes, such as fluid drain hole 138, are defined through the plate, and a plurality of can contents contacting projections, such as projection 142, are located on second surface 134 of the plate. The fluid drain holes permit fluid to move through the plate and out of a can being drained and the projections ensure that all of the fluid will be forced out of the food contained in the can being drained. An outer dimension 144, such as a diameter, of the plate is measured on the outer rim of the plate and is greater than dimension 52 of inner annular opening 50 of the can supporting element and is smaller than inner dimension 42 of outer wall 38 of the can supporting element. A screw thread 152 is defined on outer rim 140 of the plate. Plate 130 is located on distal end 126 of support post 122 to fit into outer wall 38 of the can supporting element when the first and second handle elements are moved toward each other as can be understood from the disclosure of FIG. 1.

A pivot hinge 160 is located on second end 106 of body section 102. Link 74 connects body section 102 of the second handle element to the trigger unit so the second handle element moves in cooperation with movement of trigger element 66.

A connecting section 170 is located on second end 22 of the first handle element and connects the first and second handle elements together. Connecting section 170 extends at an angle to body section 16 of the first handle element.

Second handle element 100 is V-shaped, and first handle element 14 is Z-shaped. A portion 174 of first handle element 14 adjacent to first end 18 of the first handle element is oriented with respect to a corresponding portion 176 of second handle element 100 adjacent to first end 104 of the second handle element to be parallel to portion 176 of second handle element 100 when plate 130 of the can contents contacting element is located inside tubular outer wall 38 of the can supporting element.

A first plate adapter element 180 is used to allow device 10 to be used with cans of various sizes. Element 180 has a tubular wall 182 with a screw thread 184 defined on thereon. Screw thread 184 is sized and adapted to threadably engage screw thread 152 on the outer rim of the plate of the can contents engaging element to attach element 180 to plate 130.

A plate 186 has a first surface 188, a second surface 190 and an outer rim 192 which connects the first and second surfaces of plate 186. Fluid drain holes, such as hole 194, are defined through plate 186 and a plurality of can contents contacting projections, such as projection 196, are located on second surface 190 of plate 180 in a manner similar to projections 142 on plate 130. Plate 186 has an outer dimension 198, such as an outer diameter, which is measured on outer rim 192 that is greater than dimension 52 of inner annular opening 50 of the can supporting element and smaller than dimension 42 of tubular outer wall 38 of the can supporting element.

Fluid drain holes 194 of first plate adapter element 180 are in fluid communication with fluid drain holes 138 defined through plate 130 of the can contacting element when first plate adapter element 180 is threadably mounted on plate 130 of the can contents contacting element.

A second plate adapter element 200 is shown in FIG. 5 and is used for cans having still different sizes. Element 200 has a tubular wall 202 with a screw thread 204 defined thereon. Screw thread 204 is sized and adapted to threadably engage screw thread 152 on the outer rim of plate 130 of the can contents engaging element to releasably attach element 200 to unit 120.

A tubular can contents engaging element 210 is located on tubular wall 202 and has a tubular wall 212 with an outer dimension 214, such as an outer dimension, that is smaller than dimension 52 of inner annular opening 50 of the can supporting element. A plurality of fluid drain holes, such as hole 216, are defined through tubular wall 202.

Screw thread 204 is sized and adapted to threadably engage screw thread 152 on outer rim 140 of plate 130 to releasably connect element 200 to plate 130.

Fluid drain holes 216 of the second plate adapter are in fluid communication with fluid drain holes 138 defined through plate 130 of the can contacting element when second plate adapter 200 is threadably mounted on plate 130.

A can support adapter element 220 permits use of device 10 with cans of various sizes and includes a tubular projection 222 having an outer dimension 224 that is smaller than dimension 52 of inner annular opening 50 of can supporting element 36.

A tubular wall 226 is associated with the tubular projection. Tubular wall 226 has an outer dimension 228 that is smaller than inner dimension 42 of inner surface 40 of the can supporting element on the first handle element.

A support element 300 is shown in FIG. 7 and is used to mount the handle unit on a wall. Element 300 includes a handle unit accommodating section 302 and a plurality of adapter element supports, such as support 304, thereon. Section 302 can include a metal piece to which magnet 80 is attracted to ensure secure mounting of handle unit 12 on support element 300.

Use of device 10 can be understood from the foregoing, and thus will be only briefly discussed. A can to be drained is opened by any convenient means and is placed in unit 36 or in an adapter so the can is securely held on handle element 14. The appropriate size pressing plate, such as plate 130, is selected and the handles are forced together using handles 14 and 100. Once the initial pressing is completed, trigger unit 64 can be operated to further press fluid from the can. The drained can then be removed from the handle unit. The adapters can be used to ensure proper attachment of the can to handle unit 12 and proper draining of the secured can.

While various embodiments of the invention have been described, it will be apparent to those of ordinary skill in the art that many more embodiments and implementations are possible within the scope of this invention. Accordingly, the invention is not to be restricted except in light of the attached claims and their equivalents.

What is claimed is:

1. A device for squeezing fluid from a can containing food packed in fluid comprising:
    (1) a first handle element having a first surface and a second surface, a can supporting element positioned on the first surface, the first handle having a trigger unit, the trigger unit including
        (i) a movable trigger element,
        (ii) a lever element,
        (iii) a link element connecting one portion of the lever element to the trigger element so movement of the trigger element causes corresponding movement of the lever element,
        (iv) a second link element connected to another portion of the lever element for movement therewith so that movement of the trigger element is transferred to the second link element to cause the lever element to move between a normal position and an extended position, where in the extended position, the lever element further extends from the second surface of the first handle element,
        (v) a leverage element on the second surface of the first handle element, and
        (vi) a magnet between the leverage element and the lever element such that when the lever element is in the normal position, the magnet is capable of attracting a lid that is opened from a can, and when the lever element is in the extended position, the lever element pushes the lid away from the magnet to free the lid from the magnet; and (2) a second handle element pivotably coupled to the first handle element such that the first handle faces the first surface of the second handle element, the second handle element including a can contents contacting element which includes a support post, a plate on the support post, and fluid drain holes defined through the plate.

2. The device according to claim 1, the can supporting element which includes a tubular outer wall having an inner surface with an inner dimension, an inner rim located on the inner surface of the outer wall, the inner rim having an inner edge which defines an inner annular opening, the inner annular opening having a dimension which is less than the inner dimension of the outer wall, and the support post having a base end and a distal end, the plate having a first surface, a second surface, an outer rim connecting the first and second surfaces of the plate, a plurality of can contents contacting projections on the second surface of the plate, and an outer dimension measured on the outer rim of the plate that is greater than the dimension of the inner annular opening of the can supporting element and smaller than the dimension of the inner dimension of the outer wall of the can supporting element, a screw thread on the outer rim of the plate, the plate being located on the distal end of the support post to fit into the outer wall of the can supporting element when the first and second handle elements are moved toward each other.

* * * * *